US012155165B2

(12) United States Patent
Vegh et al.

(10) Patent No.: US 12,155,165 B2
(45) Date of Patent: Nov. 26, 2024

(54) CART GROUNDING DEVICE FOR A CONVEYOR ASSEMBLY

(71) Applicant: Intelligrated Headquarters, LLC, Mason, OH (US)

(72) Inventors: Mark Kenneth Vegh, Frederick, MD (US); Richmond Emory Best, Mount Airy, MD (US); Aaron Arney, Frederick, MD (US); Ian Raun, Sharpsburg, MD (US)

(73) Assignee: Intelligrated Headquarters, LLC, Mason, OH (US)

( * ) Notice: Subject to any disclaimer, the term of this patent is extended or adjusted under 35 U.S.C. 154(b) by 144 days.

(21) Appl. No.: 17/811,435

(22) Filed: Jul. 8, 2022

(65) Prior Publication Data

US 2024/0014616 A1 Jan. 11, 2024

(51) Int. Cl.
*B65G 43/00* (2006.01)
*B65G 47/96* (2006.01)
*B65G 54/02* (2006.01)
*H01R 39/64* (2006.01)

(52) U.S. Cl.
CPC ............. *H01R 39/64* (2013.01); *B65G 43/00* (2013.01); *B65G 2207/10* (2013.01)

(58) Field of Classification Search
None
See application file for complete search history.

(56) References Cited

U.S. PATENT DOCUMENTS

| 3,171,362 | A |   | 3/1965 | Noye et al. |
| 4,263,122 | A |   | 4/1981 | Urquhart |
| 5,208,635 | A | * | 5/1993 | Reese ................. G03G 15/754 |
|           |   |   |        | 399/168 |
| 5,757,606 | A |   | 5/1998 | Westerberg |

(Continued)

FOREIGN PATENT DOCUMENTS

| CN | 202124296 U | 1/2012 |
| CN | 213230124 U | 5/2021 |

OTHER PUBLICATIONS

Extended European Search Report Mailed on Dec. 6, 2023 for EP Application No. 23180217, 8 page(s).

(Continued)

*Primary Examiner* — Kavel Singh
(74) *Attorney, Agent, or Firm* — Alston & Bird LLP

(57) ABSTRACT

Various embodiments are directed to cart grounding devices for conveyor assemblies and methods of using the same. In various embodiments, a cart grounding device for a conveyor assembly may comprise a frame engagement element configured for attachment to at least a portion of a conveyor assembly; an arm assembly comprising an arm element hingedly connected relative to the frame engagement element; and a cart interface component configured to physically engage a connected plurality of conveyor carts of the conveyor assembly to provide a ground path from the conveyor carts to a ground, the cart interface component comprising one or more grounding wheels configured to physically contact the conveyor carts and rotate about a respective central wheel axle based on the physical contact with the conveyor carts, wherein the arm assembly defines a biased configuration that biases the cart interface component in a direction towards the conveyor carts.

20 Claims, 9 Drawing Sheets

(56) References Cited

U.S. PATENT DOCUMENTS

| | | | | |
|---|---|---|---|---|
| 6,134,406 | A * | 10/2000 | Moe | B65G 39/16 |
| | | | | 347/116 |
| 8,997,973 | B2 * | 4/2015 | DePaso | B65G 43/00 |
| | | | | 198/691 |
| 9,102,336 | B2 * | 8/2015 | Rosenwinkel | H04B 10/114 |
| 10,046,920 | B1 * | 8/2018 | Green | B65G 45/22 |

OTHER PUBLICATIONS

Jeff Burleson, "Wiring and grounding to prevent power quality problems with industrial equipment", [Proceedings] IEEE 1991 Annual Textile, Fiber and Film Industry Technical Conference, 1-6, (1991).

* cited by examiner

CART GROUNDING DEVICE FOR A CONVEYOR ASSEMBLY

FIELD OF THE INVENTION

Various embodiments described herein relate generally to materials handling systems including sortation conveyors that sort discrete articles to one of multiple destinations, and more specifically a cart grounding device used to ground a dynamic sorter cart train.

BACKGROUND

Applicant has identified many technical challenges and difficulties associated with establishing a ground path between a ground and a dynamic chain of conveyor carts during operation of a sortation conveyor. Through applied effort, ingenuity, and innovation, Applicant has solved problems related to these materials handling systems by developing solutions embodied in the present disclosure, which are described in detail below.

BRIEF SUMMARY

Various embodiments are directed to cart grounding devices for conveyor assemblies and methods of using the same. In various embodiments, a cart grounding device for a conveyor assembly may comprise a frame engagement element configured for attachment to at least a portion of a conveyor assembly; an arm assembly comprising an arm element defined by an arm length the extends from a proximal arm end to a distal arm end, the arm element being hingedly connected relative to the frame engagement element at the proximal arm end; and a cart interface component connected to the distal arm end of the arm element and configured to physically engage at least a portion of a connected plurality of conveyor carts of the conveyor assembly to provide a ground path from the connected plurality of conveyor carts to a ground, the cart interface component comprising one or more grounding wheels configured to physically contact the at least a portion of the connected plurality of conveyor carts to define at least a portion of the ground path, each of the one or more grounding wheels being configured to rotate about a respective central wheel axle based on one or more forces imparted on the grounding wheel from the at least a portion of the connected plurality of conveyor carts in physical contact therewith, wherein the arm assembly defines a biased configuration defined by a biasing force that biases the cart interface component in one or more directions at least partially towards the connected plurality of conveyor carts.

In various embodiments, the cart interface component is pivotably connected to the arm element at one or more distal hinges provided at the distal arm end of the arm element. In various embodiments, the cart interface component may be configured to freely rotate about the one or more distal hinges independent of an angular configuration of the arm element. In various embodiments, the cart interface component may be configured such that a center of gravity of the cart interface component is positioned at least substantially directly below an axis of rotation defined by the distal hinge. In various embodiments, the one or more grounding wheels of the cart interface component may be defined by a plurality of grounding wheels. In certain embodiments, the plurality of grounding wheels may be arranged such that each of the respective central wheel axles extends in a direction perpendicular to the arm length of the arm element such that a rotation of each grounding wheel is defined in a rotational direction that is at least substantially parallel to a cart travel path along which the chained plurality of conveyor carts travel throughout the conveyor assembly. In various embodiments, the plurality of grounding wheels may comprise three grounding wheels. In certain embodiments, the three grounding wheels may be distributed along a cart interface component length defined by the cart interface component such that the three grounding wheels define a consecutive arrangement as measured in a direction parallel to a cart travel path defined by the conveyor assembly.

In various embodiments, the cart interface component may further comprise one or more connection rods physically engaged with each of the one or more grounding wheels to operatively connect each of the one or more grounding wheels to the ground, wherein the each of the one or more connecting rods defines at least a portion of the ground path. In various embodiments, the cart interface component may further comprise a housing element engaged with each of the one or more grounding wheels and configured to facilitate a fixed linear arrangement of each of the one or more grounding wheels along a cart interface component length of the cart interface component. In various embodiments, each of the one or more grounding wheel may comprise a plurality of conductive bristles extending from the respective central wheel axle in a radially outward direction, the plurality of conductive bristles being distributed throughout an outer surface defined by the central wheel axle. In certain embodiments, the plurality of conductive bristles may be made of an at least substantially non-rigid, conductive material.

In various embodiments, the biased configuration of the arm assembly may be defined at least in part by a spring element configured to apply one or more bias forces to the arm element to bias that arm element in a first rotational direction defined relative to an axis of rotation defined by a base hinge, the base hinge being configured to define the hinged connection between the arm element and the frame engagement element; wherein the first rotational direction is defined such that the arm element is biased to rotate at least partially away from a top surface of the frame engagement element. In various embodiments, the cart grounding device may be configured such that the arm element being biased to rotate in the first rotational direction at least partially away from the top surface of the frame engagement element causes the cart interface component to be biased to move in a first linear direction defined in an at least partially vertically upward direction. In various embodiments, the frame engagement element may be configured to engage a conveyor frame of the conveyor assembly to define a position of the cart grounding device along a cart travel path along which the chained plurality of conveyor carts travel throughout the conveyor assembly. In certain embodiments, the position of the cart grounding device is defined by an arrangement wherein the cart grounding device is positioned directly beneath at least a portion of the cart travel path.

In various embodiments, the cart grounding device may further comprise a ground wire operatively connected to both the ground and the one or more grounding wheels of the cart interface component. In various embodiments, the cart interface component may be configured such that the ground path defined upon the physical engagement with the at least a portion of the connected plurality of conveyor carts is established by a contact of the at least a portion of the connected plurality of conveyor carts with any of the one or more grounding wheels. In various embodiments, the one or more grounding wheels may comprise a rotatable configuration that minimizes the impact of the engagement between the conveyor carts and the cart interface component to enable a grounding wheel configuration defined by a plurality of conductive bristles made from a material having an increased electrical capacity; wherein the increased electrical capacity of the conductive bristles of the grounding wheels corresponds to the ground path being defined by an increased electrical load capacity.

Various embodiments are directed to a method of operating a cart grounding device for a conveyor assembly, the method comprising: arranging a cart grounding device relative to a conveyor assembly such that each of a connected plurality of conveyor carts physically engages the cart grounding device as the conveyor cart moves along a cart travel path defined by the conveyor assembly, the cart grounding device comprising: a frame engagement element configured for attachment to at least a portion of the conveyor assembly; an arm assembly comprising an arm element defined by an arm length the extends from a proximal arm end to a distal arm end, the arm element being hingedly connected relative to the frame engagement element at the proximal arm end; and a cart interface component connected to the distal arm end of the arm element and configured to physically engage the connected plurality of conveyor carts to provide at least one ground path from the connected plurality of conveyor carts to a ground, the cart interface component comprising one or more grounding wheels configured to physically contact the connected plurality of conveyor carts to define at least a portion of the at least one ground path, each of the one or more grounding wheels being configured to rotate about a respective central wheel axle based on one or more forces imparted on the grounding wheel from the connected plurality of conveyor carts in physical contact therewith, wherein the arm assembly defines a biased configuration defined by a biasing force that biases the cart interface component in one or more directions at least partially towards the connected plurality of conveyor carts; and wherein the cart interface component of the grounding device is configured to maintain a continuous physical contact between at least a portion of the one or more grounding wheels and the connected plurality of conveyor carts as the connected plurality of conveyor carts moves along the cart travel path.

BRIEF DESCRIPTION OF THE DRAWINGS

Reference will now be made to the accompanying drawings, which are not necessarily drawn to scale, and wherein.

DETAILED DESCRIPTION

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations.

Figure 1:
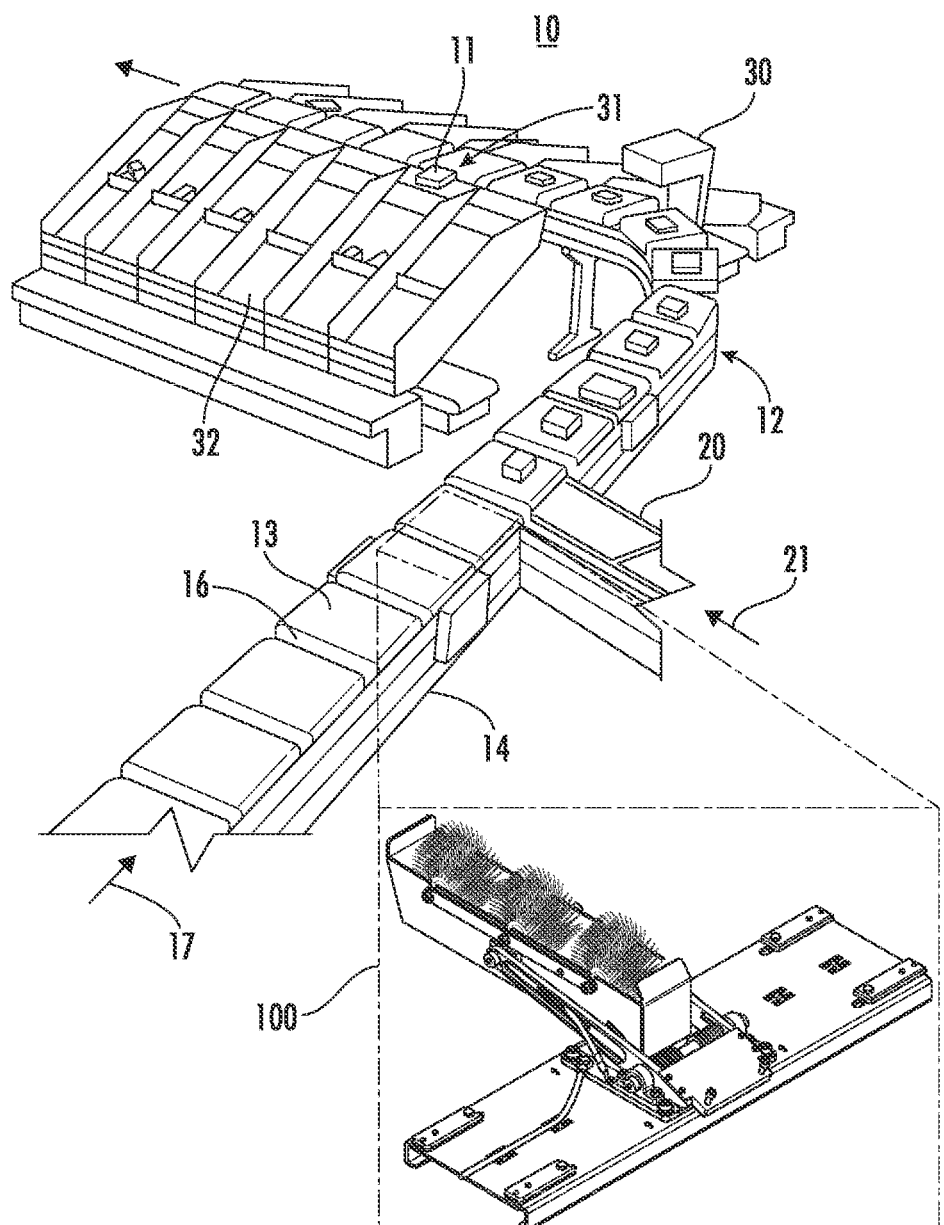
FIG. 1 illustrates a fragmentary partially exploded perspective view of a material handling system including a sortation conveyor comprising a cart grounding device configured for engagement with a plurality of conveyor carts, according to one or more embodiments.

FIG. 1 illustrates a material handling system 10 that includes a sortation conveyor 12 that provides induction of items (for example, articles, cartons, parcels, boxes, products, and/or the like) from different source locations and discharging of the items to a destination location. According to various embodiments illustrated herein, the sortation conveyor 12 may be any of: a cross belt (CB) loop sorter, a tilt tray sorter or a pusher-carriage, or any other sorter type, conventionally known in state of art. As illustrated herein, one or more induction conveyors 20 may transfer articles 11 to respective locations of the sortation conveyor 12, such as inbound direction indicated by arrow 21. The sortation conveyor 12, in this regard, may comprise of multiple carts which runs via rails along a conveyor bed 14 such as, a conveyor frame or a sorter frame. In this regard, multiple cart frames, (also referred herein as carts, hereinafter throughout the description) are covered with a moving carriage or a moving carrier cart, such as a cart 15 that runs along with the carts, via engagement of rails associated with the carts along the conveyor bed 14. Accordingly, for transportation of articles from a source (e.g., inventory location) to a destination (e.g., chutes, a container, downstream conveyors, and/or the like), the articles 11 are positioned on a carriage 13 such as, but not limited to, a cross-belt carriage on the moving carrier cart, such as the cart 15 that endlessly conveys on a conveyor bed 14 in a looping direction along a cart travel path indicated by arrow 17. Illustratively, an indicia reader 30 may also be provided along the sortation conveyor 12 to read coded information placed on the articles 11, while the articles 11 are in transit on the sortation conveyor 12.

Illustratively, the sortation conveyor 12, along with transporting the articles 11, may also sort the articles 11, as these articles 11 moves along a length of the sortation conveyor 12. In this aspect, the sortation conveyor may transport the articles 16 into various downstream lanes, for instance, via transfer chutes 31 into different picking units 32. As illustrated, different adjacent carts along the cross-belt carriage 13 may be connected together over an engagement means 16 of respective carts 15, via one or more cart coupling assembly. In various embodiments, the sorter conveyor 12 of a material handling system 10 may include a cart grounding device 100 fixedly secured relative to at least a portion of a conveyor frame 14 and configured to continuously engage at least a portion of the plurality of electrically conductive conveyor carts 15 as the conveyor carts 15 move relative to the cart grounding device 100 to ground the plurality of conveyor carts 15 as they are dynamically moved throughout the material handling system 10. For example, the cart grounding device 100 may be configured to dynamically ground the plurality of conveyor carts 15 within a loop sortation system, such as, for example, the sortation conveyor 12 as illustrated in FIG. 1, as the carts 15 are transported along the conveyor of the looped sorter system by maintaining a contact between the cart grounding device 100 (e.g., a cart interface component defined by a plurality of grounding wheels conductively connected to a ground line) and at least one of a plurality of conveyor carts 15. For example, the plurality of conveyor carts 15 may comprise a chain of conveyor carts 15 physically connected to one another to facilitate a collective movement of each of the plurality of carts 15 along a conveyor travel path defined by the conveyor frame 14 during operation of the sortation system. In various embodiments, the plurality of conveyor carts 15 may be electronically connected to one another (e.g., via a daisy-chained configuration) such that a cart grounding device 100 physically engaging one of the carts 15 to establish a high-load ground path from the cart 15 to the earth (e.g., via a ground wire of the cart grounding device 100) may effectively ground each of the carts 15 in the plurality within the materials handling system 10. Various embodiments with reference to FIGS. 2-5C hereinafter, describe further details of the cart grounding device 100 for establishing a high-load ground path between the earth and a dynamic plurality of conveyor carts being used in a sorter system, like the sortation conveyor 12 as illustrated in FIG. 1.

Figure 2:
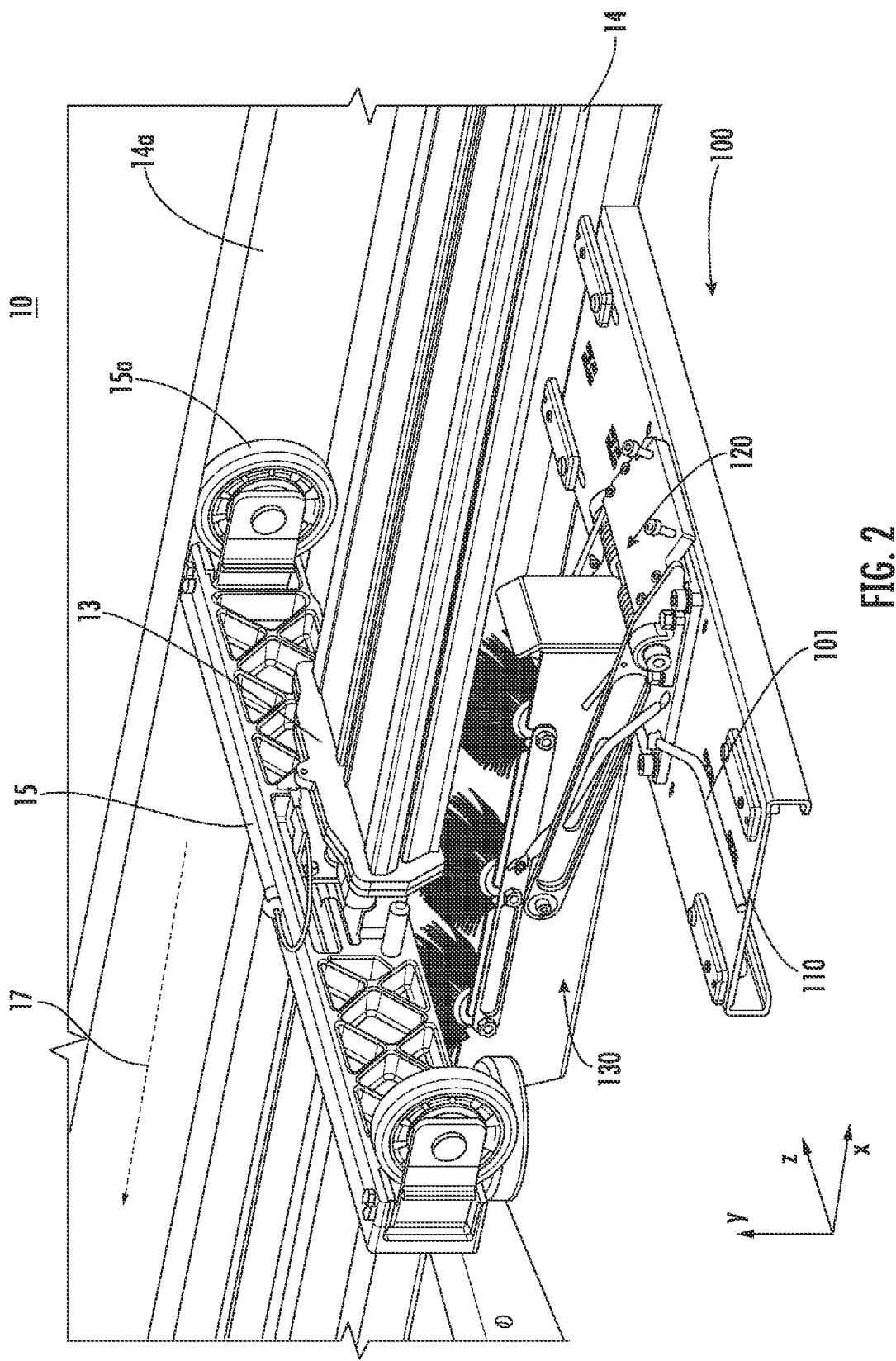
FIG. 2 illustrates a perspective view of an exemplary cart grounding device arranged relative to various components of an exemplary sortation conveyor according to various embodiments described herein.

FIG. 2 illustrates a perspective view of an exemplary cart grounding device 100 arranged relative to various components of an exemplary sortation conveyor of FIG. 1, in accordance with various embodiments of the present disclosure. For example, as illustrated in FIG. 2, in various embodiments, an exemplary cart grounding device 100 may be secured relative to at least a portion of the conveyor frame 14 of an exemplary sortation conveyor 12 in a position along the conveyor travel path wherein a cart interface component 130 of the grounding device 100 physically contacts at least a portion of each of the plurality of conveyor carts 15 they travel along the guide rail 14a of the conveyor frame 14 (e.g. along the conveyor travel path). In various embodiments, the sorter conveyor 12 may include a conveyor frame 14 defined at least in part by one or more guide rails 14a along which each conveyor cart 15 engaged with the cart carriage assembly 13 as it is moved through the cart travel path defined by the sorter conveyor. For example, the guide rails 14a may define the conveyor travel path along which the plurality of carts 15 travel in a looped configuration throughout the sorter conveyor 12. In various embodiments, an exemplary cart grounding device 100 may be rigidly secured relative to at least a portion of the conveyor frame 14 (e.g., at least one of the lateral sidewalls and/or guide rails 14a) in a position along the conveyor travel path defined by the guide rails 14a and underneath the portion of the conveyor frame 14 (e.g., the guide rails 14a) along which the carts 15 are moved such that at least a portion of each of the plurality of carts 15 passes overtop the cart grounding device 200 as it travels along the conveyor travel path.

In various embodiments, the cart grounding device 100 may comprise a ground wire 101 that is operatively connected between a ground (e.g., the earth) and the cart interface component 130 of the cart grounding device 100. For example, the plurality of carts 15 may be configured such that a high electrical load may be carried by the plurality of carts 15 during operation of the sorter conveyor 12. The cart grounding device 100 may be configured such that a physical contact of at least a portion of the cart interface component 130 (e.g., one of]a plurality of grounding wheels) to a conductive surface of one the plurality of carts 15 as the cart 15 is passes above the cart grounding device 100 (e.g., along the conveyor travel path) may define a low-resistance, high-electrical-load-capacity ground path between the plurality of chained conveyor carts 15 and the earth via the ground wire 101.

Figure 3:
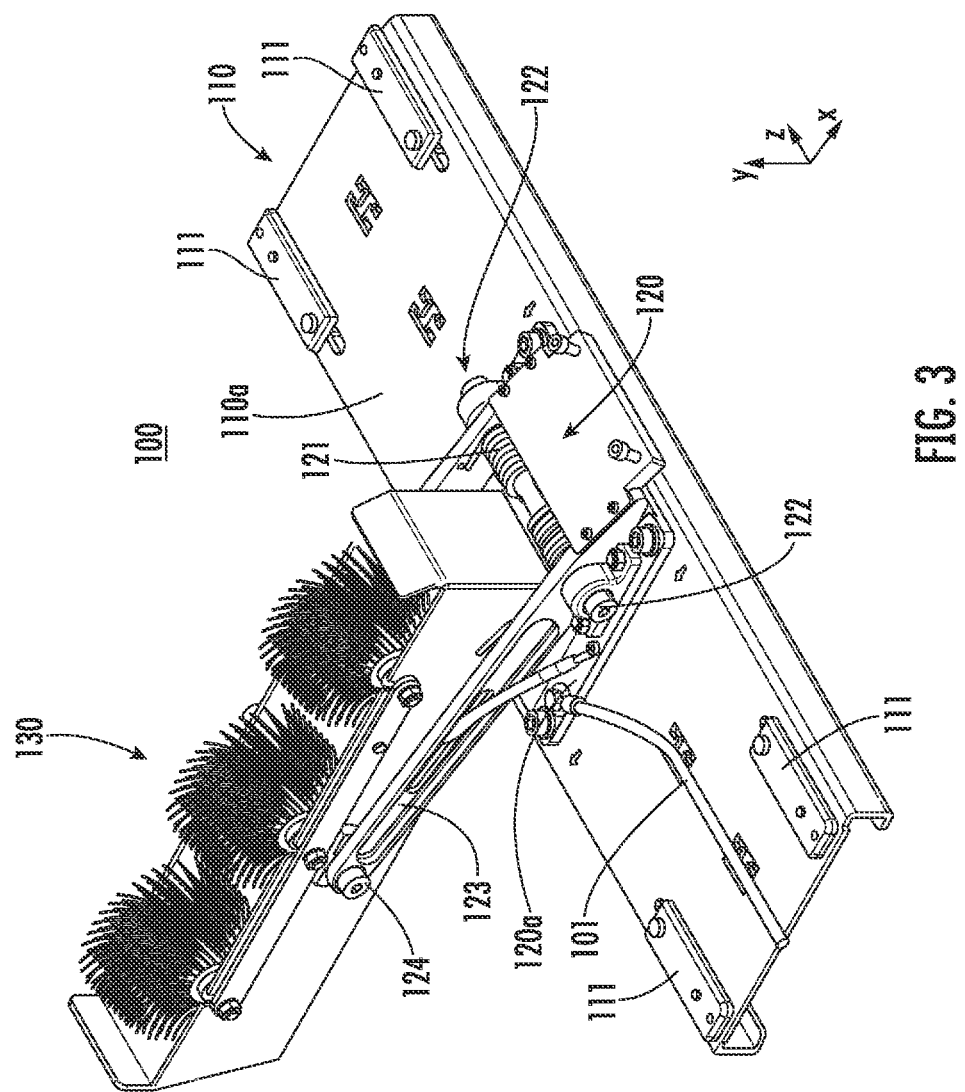
FIG. 3 illustrates a perspective view of an exemplary cart grounding device in accordance with various embodiments of the present disclosure.

FIG. 3 illustrates a perspective view of an exemplary cart grounding device in accordance with various embodiments of the present disclosure. In particular, FIG. 3 illustrates the cart grounding device 100 shown in the exemplary embodiments of FIGS. 1 and 2. As illustrated, in various embodiments, an exemplary cart grounding device 100 configured for at least substantially continuous engagement with a dynamic plurality of carts of a material handling system may comprise, a frame engagement element 110, an arm assembly 120, and a cart engagement assembly 130 that is operatively connected to the ground wire 101 of the cart grounding device 100 such that the plurality of carts is grounded upon being in physical contact with the cart interface component 130. For example, the exemplary cart grounding device 100 illustrated in FIG. 3 includes a frame engagement element 110 configured to be fixedly secured to a portion of a conveyor frame so as to define the fixed position of the cart grounding device 100 within the material handling system along the conveyor track path defined by the sorter conveyor of a material handling system 10 (e.g., vertically beneath the guard rails defining the conveyor travel path). For example, the frame engagement element 110 may be rigidly secured to the conveyor frame (e.g., a sidewall, a guard rail, a bottom frame surface and/or the like) so as to establish the position of the cart grounding device 200 along the cart travel path of the sorter conveyor. As illustrated, in various embodiments the frame engagement element 110 may comprise an at least substantially planar rigid component arranged relative to the conveyor frame so as to extend in an at least partially lateral direction along a width of the sorter conveyor between opposing lateral sides of the frame (e.g., in the z-direction as defined in the exemplary orientation illustrated in FIG. 3).

As illustrated, the frame engagement element 110 may comprise one or more fastening means 111 configured to facilitate the attachment of the frame engagement element 110 to the conveyor frame. As non-limiting examples, in various embodiments, the fastening means 111 may comprise a bolt, a pin, a latch, a hook, and/or any other suitable mechanical fastening means configured to fasten the frame engagement element 110 relative to at least a portion of the conveyor frame In various embodiments, the frame engagement element 110 may be defined at least in part by a top surface along which at least a portion of the arm assembly 120 of an exemplary cart grounding device 100 may be arranged, as described in further detail herein.

In various embodiments, the exemplary cart grounding device may further comprise an arm assembly 120 connected to both the frame engagement element 110 and the cart interface component 130 and configured to bias the cart interface component 130 in an extended position above the above the frame engagement element 110 such that the plurality of carts of the material handling system physically contact at least a portion of the cart interface component 130 (e.g., the plurality of grounding wheels) as they travel over the cart grounding device 100 along the cart travel path. As illustrated, the arm assembly 120 may be rigidly secured relative to a top surface 110a of the frame engagement element 110. For example, in various embodiments, the arm assembly 120 may comprise a frame attachment component 120a configured to facilitate the coupling of the arm assembly 120 relative to the top surface 110a of the frame engagement element 110. In various embodiments, the arm assembly 120 may comprise an arm element 123 that is hingedly secured relative to the frame engagement element 110 via one or more base hinges 122. The arm element 123 may be defined at least in part by an arm length that extends from a proximal arm end at which the arm element 123 is hingedly connected to the one or more base hinges 122, to a distal arm end at which the arm element 123 is connected to the cart interface component 130 (e.g., via one or more distal hinges 124).

In various embodiments, the one or more base hinges 122 may be secured relative to the frame attachment component 120a such that the arm element 123 rotating (e.g., pivot) about an axis of rotation (e.g., through a range of rotational motion) defined by the base hinges 122 may correspond to the arm element rotating relative to the frame engagement element 110. For example, as illustrated, the axis of rotation defined by the base hinge 122 extends in a lateral direction that is at least substantially parallel to the width of the frame engagement element 110 (e.g., in a direction between opposing lateral sides of a conveyor frame, such as, for example, in a z-direction as defined in the exemplary orientation illustrated in FIG. 3). In such an exemplary circumstance, the range of rotational motion of the arm element 123 may be defined within a plane that is at least substantially perpendicular to the top surface 110a of the frame engagement element 110 and/or at least substantially parallel to a direction of the conveyor travel path as defined by the sorter conveyor (e.g., in the x-y plane as defined in the exemplary orientation illustrated in FIG. 3). For example, as described in further detail herein, the arm assembly 120 may be configured such that the range of rotational motion of the arm element 123 about the base hinges 122 is defined at least in part by a variable angle of separation between the arm length of the arm element 123 and the plane along which the axis of rotation of the base hinges 122 is defined, such as, for example, an angle of separation between the arm length of the arm element 123 and the top surface 110a of the frame engagement element 110 (e.g., an angle defined in the x-y plane as defined in the exemplary orientation illustrated in FIG. 3).

In various embodiments, the arm assembly 120 may further comprise a spring element 121 configured to apply one or more bias forces to the arm element 123 to bias the rotation thereof about the base hinges 122 in a direction at least substantially away from the top surface 110a of the frame engagement element 110 such that the cart interface component 130 disposed at the distal arm end of the arm element 123 is biased in an at least partially vertically upward direction (e.g., in the positive y-direction as defined in the exemplary orientation illustrated in FIG. 3). For example, the spring element 121 may be engaged with the arm element 123 such that the arm assembly 120 is defined by a biased configuration in which the arm element 123 is biased by a spring force that causes the arm element 123 to rotate (e.g., about the base hinges 122) in a rotational direction that corresponds to an increase in the angle of separation between the arm element 123 and the top surface 110a (e.g., rotating towards a configuration wherein in the angle of separation approaches 90 degrees). For example, the force from the spring element 121 may cause the arm element to rotate about the base hinges 122 such that the vertical position of the cart interface component 130 is raised relative to the conveyor frame of the sorter conveyor. For example, in the exemplary cart grounding device 100 illustrated in FIG. 3, the biased configuration of the arm assembly 120 may be defined by one or more spring forces acting on the arm element 123 from the spring element 121 to cause the rotation of the arm element about the base hinges 122 in the clockwise direction, so as to increase a vertical separation distance between the frame engagement element 110 and the cart interface component 130 (e.g., as defined in a vertical direction, such as, for example, in the y-direction according to the exemplary orientation shown in FIG. 3). As such, the biased configuration of the arm assembly 120 may correspond to the cart interface component 130 being biased in an upward vertical direction (e.g., in the positive y-direction as defined in the exemplary orientation illustrated in FIG. 3) in order to promote the physical engagement of the cart interface component 130 with the plurality of carts of the material handling system as they travel above the cart grounding device 100 along the cart travel path defined by the sorter conveyer.

In various embodiments, the cart grounding device 100 may comprise a cart interface component 130 operatively connected (e.g., conductively connected) to the ground wire 101 of the cart grounding device 100 and configured to physically contact the plurality of carts as the carts are moved throughout the sorter conveyor (e.g., along a cart travel path defined by the conveyor frame) to ground the dynamic plurality of carts throughout operation of the material handling system. As illustrated, the cart interface component 130 is connected to the arm assembly 120 at the distal arm end of the arm element 123 such that the cart interface component 130 is configured to move relative to the frame engagement element 110 (e.g., in an at least partially vertical direction) upon the rotation of the arm element 123 about the base hinges 122. In various embodiments, the cart interface component 130 may be defined by a cart interface component width and a cart interface component length. The cart interface component width of the cart interface component 130 may be defined in a lateral direction that is at least substantially parallel to the width of the frame engagement element 110, such as, for example, in a direction between opposing lateral sides of a conveyor frame (e.g., in the z-direction as defined in the exemplary orientation illustrated in FIG. 3). Further, the cart interface component length of the cart interface component 130 may be defined in a longitudinal direction perpendicular to the direction of the cart interface component width, such as, for example, in a direction that is at least substantially parallel to the arm length of the frame engagement element 110 and parallel to the opposing lateral sides of a conveyor frame (e.g., in the x-direction as defined in the exemplary orientation illustrated in FIG. 3). For example, the cart grounding device 100 may be configured such that the cart interface component length of the cart interface component 130 is defined in a direction that is at least substantially parallel to the direction of the cart travel path as defined along the portion of the sorter conveyor corresponding to the position of the cart grounding device 100. In various embodiments, the cart interface component 130 may be configured such that the cart interface component length is greater than the distance defining the gap between adjacent conveyor carts of the material handling system. As a non-limiting example, the cart interface component length of the cart interface component 130 may be greater than at least approximately twice the distance defining the gap between adjacent conveyor carts of the material handling system (e.g., in the x-direction as defined in the exemplary orientation illustrated in FIG. 3).

Figure 4:
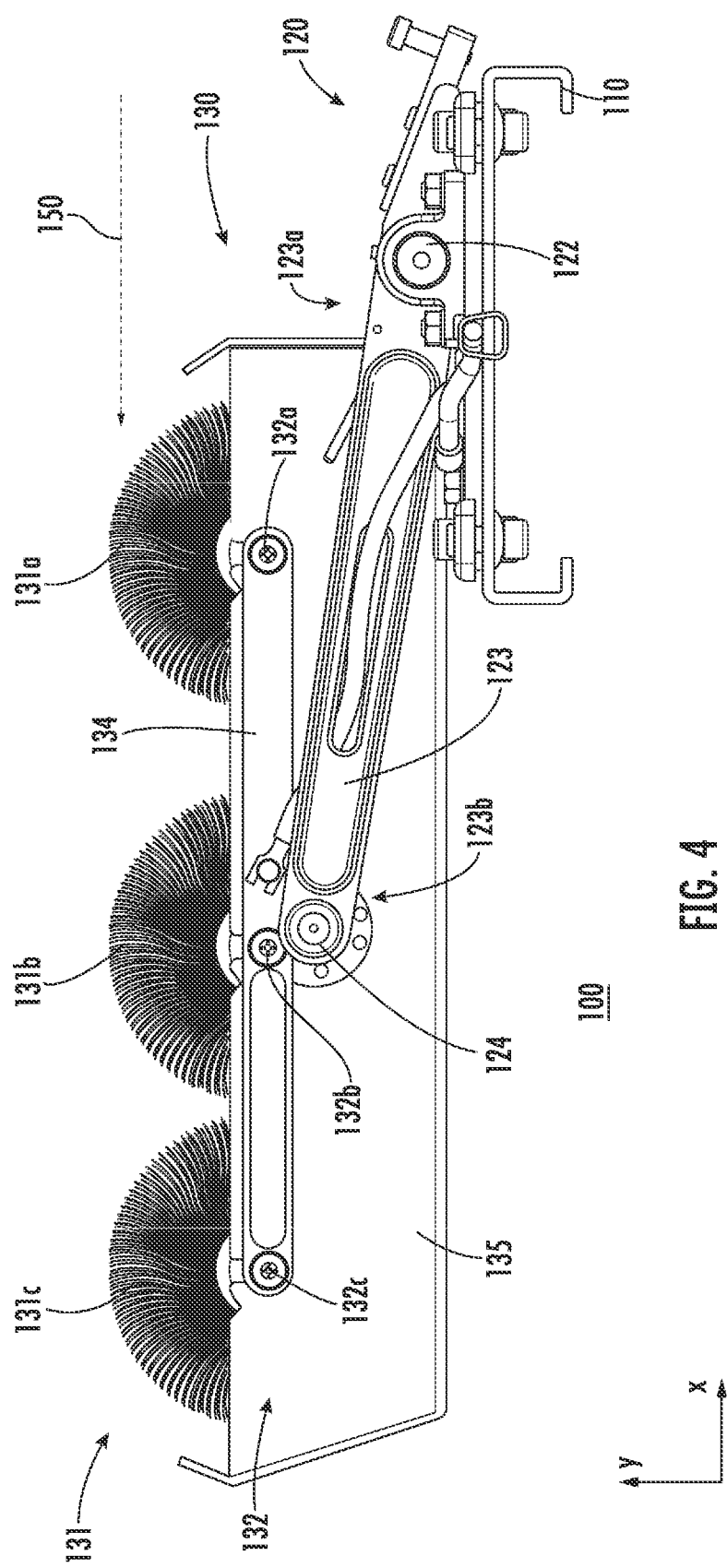
FIG. 4 illustrates a side view of an exemplary cart grounding device in accordance with various embodiments of the present disclosure.

FIG. 4 illustrates a side perspective view of an exemplary cart grounding device 100 according to various embodiments described herein. As illustrated, the distal arm end 123a of the arm element 123 is hingedly secured to the base hinges 122 and the proximal arm end 123b of the arm element 123 is pivotably connected to the cart interface component 130 at one or more distal hinges 124. In various embodiments, an exemplary cart grounding device 100 may comprise a cart interface component 130 that is configured to freely rotate about the one or more distal hinges 124 independent of the angular configuration defined by the arm element 123 (e.g., relative to the frame engagement element 110). For example, the cart interface component 130 may be configured to rotate about an axis of rotation defined by the one or more distal hinge 124 based at least in part on one or more gravitational forces acting on the cart interface element 130. As illustrated, the axis of rotation defined by the one or more distal hinge 124 extends in a lateral direction that is at least substantially parallel to the axis of rotation defined by the base hinge 122 (e.g., in a direction between opposing lateral sides of a conveyor frame, such as, for example, in a z-direction as defined in the exemplary orientation illustrated in FIG. 3). In such an exemplary circumstance, the range of relative rotational motion of the cart interface component 130 with respect to the arm element 123 may be defined within a plane that is at least substantially perpendicular to the top surface 110a of the frame engagement element 110 and/or at least substantially parallel to a direction of the conveyor travel path as defined by the sorter conveyor (e.g., in the x-y plane as defined in the exemplary orientation illustrated in FIG. 4).

As described herein, the cart grounding device 100 may be configured such that the rotation of the cart interface component 130 about the distal hinge 124 provided at the distal arm end 123b of the arm element 123 is at least substantially independent of the rotation of the arm element 123 about the base hinge 122 provided at the proximal arm end 123a of the arm element 123. In various embodiments, the distal hinge 124 may be configured such that the cart interface component 130 may move linearly with the distal arm end 123b of the arm element 123 and the cart interface component 130 may freely rotate about the distal hinge 124. For example, the cart interface component 130 may configured to maintain an at least substantially level configuration (e.g., relative to an at least substantially horizontal ground surface upon which a conveyor frame of the sorter conveyor is positioned) in an exemplary circumstance wherein the cart interface component 130 is not being acted upon by any external forces from the transmitted from the plurality of conveyor carts 200. In an exemplary circumstance wherein the moment acting on the cart interface component 130 as a result of the physical contact with the plurality of conveyor carts, as described herein, is defined by a magnitude of at least substantially zero, the cart interface component 130 may maintain an at least substantially level configuration (e.g., an at least substantially horizontal configuration) throughout a rotation of the arm element 123 about the base hinges 122 (e.g., in the clockwise direction according to the exemplary orientation illustrated in FIG. 4).

In various embodiments, the one or more distal hinge 124 may be connected to a housing element 135 of the cart interface component 130. In various embodiments, as illustrated, the housing element 135 of the cart interface component 130 may be operatively connected to each of a plurality of grounding wheels 131 of the cart interface component 130, as described herein, so as to secure the positioning of each of the grounding wheels 131 relative to one another and/or relative to the distal arm end 123b of the arm element 123. For example, in various embodiments, the cart interface component 130 may be configured such that rotation of the cart interface component 130 about the distal hinge 124 may be defined by the rotation of the housing element 135 about the axis of rotation defined by the distal hinge 124 and the corresponding linear movements of each of the plurality of grounding wheels 131 attached thereto.

In various embodiments, an exemplary cart interface component 130 may comprise a plurality of grounding wheels 131 configured to physical contact a plurality of high-speed carts travelling throughout a material handling system to define a high load ground path between the electrically conducting carts and a ground line via which the cart grounding device 100 may continuously ground the carts as they are moved along a cart travel path. For example, the cart interface component 130 is configured to maintain an at least substantially continuous physical engagement with the plurality of carts as the carts move along the cart travel path relative to the fixed cart grounding device 100 based on at least one of the plurality of grounding wheels 131 being in physical contact with at least a portion of the plurality of carts (e.g., a cart of the plurality and/or a cart carriage assembly engaged therewith) throughout the movement of the carts around the looped track defining the cart travel path.

In various embodiments, each of the plurality of grounding wheels 131 may be configured to rotate about a respective wheel axle 132 that may be connected to the housing element 135 and/or a connection rod 134 of the cart interface component 130. The cart interface component 130 may be configured such that each of the plurality of wheel axles 132 defining an axis of rotation of a respective grounding wheel of the plurality 131 may be arranged to extend in a lateral direction along the cart interface component width, as described herein. For example, each of the plurality of wheel axles 132 may extend between opposing lateral sides of the housing element 135 and be linearly fixed relative to the housing element 135 such that the plurality of grounding wheels 131 define a linearly fixed configuration relative to the housing element 135 and/or the distal arm end 123b of the arm element 123. Further, in various embodiments, as illustrated, the cart interface component 130 may comprise one or more connection rods 134 physically engaged with the housing element 135 and each of the plurality of grounding wheels 131 (e.g., each of the plurality of wheel axles 132) to secure the plurality of grounding wheels 131 relative to the housing element 135 and operatively connect (e.g., enable a conductive connection) between the plurality of grounding wheels 131. For example, the connection rod 134 may be made of an appropriate material capable of maintaining a high load ground path between each of the plurality of grounding wheels 131 and the housing element 135 (e.g., and further through the arm assembly and to the ground wire 131). For example, in various embodiments, the cart grounding device 100 may comprise a second ground wire 102 connected between the connection rod 134 and the arm assembly base plate 120a and is configured to create a current path from the connection rod 134 to the arm assembly base plate 120a so as to facilitate a conduction of current between the cart interface component 130 (e.g., the connection rod 134) and the arm assembly 120 (e.g., the arm assembly base plate 120a). For example, the second ground wire 102 may be connected at one end to the same arm assembly base plate 120a to which the ground wire 101 is connected such that the current conducted from the cart interface component 130 to the arm assembly base plate 120a via the second ground wire 102 may be further conducted from the arm assembly base plate 120a to a ground via the ground wire 101.

In various embodiments, the connection rod 134 may be defined by a length that extends along a cart interface component length and engages each of the plurality of grounding wheels 131 (e.g., each of the corresponding plurality of wheel axles 132) such that each of the plurality of grounding wheels 131 defines at least a portion of a high-load ground path capable of grounding the plurality of carts upon one of the carts physically contacting the grounding wheel 131. That is, in such an exemplary configuration, the dynamic plurality of carts moving along a cart travel path defined by a high-speed sorter conveyer of a material handling system may be grounded by the cart grounding device 100 upon a physical contact between a conductive portion of the plurality of carts (e.g., a metal surface along a bottom portion of any of the plurality of daisy-chained carts) and any of the grounding wheels of the plurality 131.

In various embodiments, each of the plurality of grounding wheels 131 may comprise a wheel component configured for rotation about a central wheel axle in response to a force that is imparted on the grounding wheel by a dynamic conveyor cart of the material handling system. For example, as a conveyor cart travels along the cart travel path in the first direction 150 through the portion of the conveyor frame to which the cart grounding device 100 is rigidly installed, at least a portion of a conveyor cart (e.g., a surface defined at least proximate to a bottom of the conveyor cart) may physically engage at least a top portion of the grounding wheel so as to cause a rotation grounding wheel about the central wheel axle thereof. The cart interface component 130 may be configured such that each of the grounding wheels 131 are configured to rotate independently of one another. Further, the grounding wheels 131 of an exemplary cart interface component 130 may each be configured to freely rotate about a respective central wheel axle 132 thereof at least partially independently of the rotation of the cart interface component 130 (e.g., the housing element 135) about the distal hinge 124. For example, each of the plurality of grounding wheels 131 may be configured to rotate about a respective axis of rotation defined by the central wheel axle 132 thereof based at least in part on one or more forces imparted thereon from the plurality of conveyor carts of the material handling system. For example, a linear force imparted on a grounding wheel as a result of a physical contact with a conveyor cart may be defined at least in part by an at least partial transfer of momentum from the conveyor cart to the grounding wheel that results in a non-lateral torque and a moment being imparted on the grounding wheel, such as, for example, in a counter-clockwise direction defined within the x-y plane, as defined in the exemplary orientation illustrated in FIG. 4.

In various embodiments, a grounding wheel of an exemplary cart grounding device 100 may embody a rotatable grounding brush having a central wheel axle and a plurality of bristles extending radially outward from a central wheel portion (e.g., an outer surface of the wheel axle), the plurality of bristles being distributed along at least substantially the entire circumference of a central wheel portion (e.g., along the entire outer surface of the wheel axle). In various embodiments, the plurality of bristles of an exemplary grounding wheel may be made of an at least substantially conductive material such that the plurality of bristles define a plurality of conductive fibers configured establish a high-load ground path between the cart grounding device 100 and conveyor cart having a conductive surface in physical contact with one or more of the conductive bristles. For example, the plurality of radial conductive bristles may collectively define the outer surface of an exemplary grounding wheel such that the radius of the grounding wheel may be defined at least in part by the length of the conductive bristles (e.g., as measured in a radially outward direction). As a non-limiting example, in various embodiments, the plurality of conductive bristles of an exemplary grounding wheel may be configured such that the radius of the grounding wheel is at least approximately between 5 mm and 150 mm (e.g., between 45 mm and 55 mm). In various embodiments, the configuration of the grounding wheel of an exemplary cart grounding device 100 may depend on the available space and/or the desired maximum rotational speed. For example, in various circumstances wherein exemplary sorter conveyors exhibit the same sorter/conveyor speed, a grounding wheel having a larger radius will rotate a slower rotational speed than a grounding wheel with a smaller radius, which may result in the larger grounding wheel having a prolonged component life relative to the smaller grounding wheel.

In various embodiments, the plurality of conductive bristles of an exemplary grounding wheel maybe made of an at least substantially non-rigid material configured to facilitate an at least substantially continuous physical contact with a conveyor cart as the length of the conveyor cart passes the grounding wheel, while minimizing the resistance forces imparted on the conveyor cart by the conductive bristles of the grounding wheel as a result of the physical contact therebetween. (e.g., a physical engagement of a conductive surface near a bottom portion of the conveyor cart with a portion of the grounding wheel provided in an uppermost position as the cart moves therethrough. As described herein, an exemplary grounding wheel may be defined by a plurality of conductive bristles made of a plurality of electrically conductive low resistance carbon fibers and/or metal, such as, for example, brass, copper, steel, and/or the like, for electrical conductivity. Alternatively, and/or additionally, various grounding wheels of the cart interface component of an exemplary cart grounding device may embody solid wheels made from an electrically conductive, low resistance material, such as, for example, a carbon impregnated polymer, a metal impregnated polymer, and/or the like. In various embodiments, the specific material and/or materials that are used to make up an exemplary grounding wheel may be based on the material of the conveyor cart surface that that the grounding wheel is configured to physically contact, such as, for example, in order to optimize the compatibility of the grounding wheel with the cart material of the conveyor cart.

Further, in various embodiments, the rotatable configuration of each of the plurality of grounding wheels 131 in a rotational direction that is at least substantially in-line with the cart travel path along which the plurality of conveyor carts move relative to the cart grounding device 100 may further minimize the physical resistance forces generated in response to the engagement of the conveyor cart with the cart interface component 130. For example, the rotatable configuration of each of the plurality of grounding wheels 131 may at least substantially reduce the magnitude of the forces generated upon the physical contact of the conveyor cart to the cart interface component 130, thereby effectively dampening the impact of the conveyor cart contact at the cart interface component 130. In various embodiments, an exemplary cart interface component 130 configured to facilitate such a low-impact interaction during grounding may enable the use of a grounding wheel 131 having a plurality of conductive bristles that are made from a conductive material that is better-suited for grounding high-electrical-capacity conveyor systems. For example, the rotatable configuration of each of the plurality of grounding wheels 131 may enable the use of a plurality of conductive bristles made from a material known to have lesser strength characteristics, but an increased capacity for electrical conductivity, thereby increasing the electrical capacity of the cart grounding device 100 and enabling the use of such exemplary cart grounding devices 100 in systems defined by high-electrical-load conditions. As a non-limiting example, a cart interface component 130 having a grounding wheel 131 that defines a rotatable configuration, as described herein, may be defined by a plurality of conductive bristles made of brass or carbon fibre.

In various embodiments, the plurality of grounding wheels 131 of a cart interface component 130 may comprise three grounding wheels distributed consecutively one-after-another along the cart interface component length of the cart interface component 130 (e.g., in the x-direction, as defined in the exemplary orientation illustrated in FIG. 4) such that a conveyor cart traveling in a first direction 150 (e.g., along a cart travel path) engages—and, subsequently, disengages—the plurality of grounding wheels 131 sequentially as the cart passes over the cart grounding device 100. For example, as illustrated in the exemplary cart grounding device 200 shown in FIG. 4, the plurality of grounding wheels 131 of a cart interface component 130 may comprise three grounding wheels, including a first grounding wheel 131a, a second grounding wheel 131b, and a third grounding wheel 131c, configured to rotate about a first wheel axle 132a, a second wheel axle 132b, and a third wheel axle 132c, respectively. In such an exemplary configuration, a conveyor cart may physically contact a top portion of each grounding wheel 131a, 131b, 131c as the cart moves in the first direction 150 such that respective forces are imparted on each of the first, second, and third grounding wheels 131a, 131b, 131c in a direction corresponding to (e.g., at least substantially parallel to) the first direction 150. The linear force realized by each grounding wheel 131a, 131b, 131c may be defined at least in part by an at least partial transfer of momentum from the conveyor cart to grounding wheel 131a, 131b, 131c, and may result in a non-lateral torque and a moment being imparted on each of the grounding wheels 131a, 131b, 131c that may cause each of the grounding wheels 131a, 131b, 131c to rotate about their respective wheel axles 132a, 132b, 132c, for example, in a counter-clockwise direction defined within the x-y plane, as defined in the exemplary orientation illustrated in FIG. 4.

In various embodiments, a linear distance between the first wheel axle 132a and the second wheel axle 132b, as defined along the cart interface component length (e.g., in an x-direction, as defined according to the exemplary orientation illustrated in FIG. 4), may be at least substantially equivalent to the linear distance between the second wheel axle 132b and the third wheel axle 132c. As a non-limiting example, in various embodiments, adjacent wheel axles of the plurality of wheel axles 132 defined by the plurality of grounding wheels 131 may be separated by a linear distance of at least approximately between 12 mm and 320 mm (e.g., between 52.5 mm and 64 mm). Further, in various embodiments, the cart interface component 130 of an exemplary cart grounding device 100 may be configured such that the center of gravity (e.g., the center of mass) of the cart interface component 130 is positioned at least substantially directly below an axis of rotation defined by the distal hinge 124 (e.g., as measured in a vertical direction, such as, for example, the negative y-direction defined in the exemplary orientation illustrated in FIG. 4). In various embodiments, the center of mass of the cart interface component 130 being defined directly below the distal hinge 124 (e.g., the axis of rotation defined thereby) enables the rotation (e.g., the angular configuration) of the cart interface component 130 about the distal hinge 124 to be independent of and/or unaffected by the angular configuration of the arm assembly 120, such that the cart interface component 130 exhibits a minimized amount of rotational movement about the distal hinge 124 as the arm assembly is rotated towards a biased configuration away from the horizontal plane defined by the top surface 110a of the frame engagement element 110.

Figure 5A:
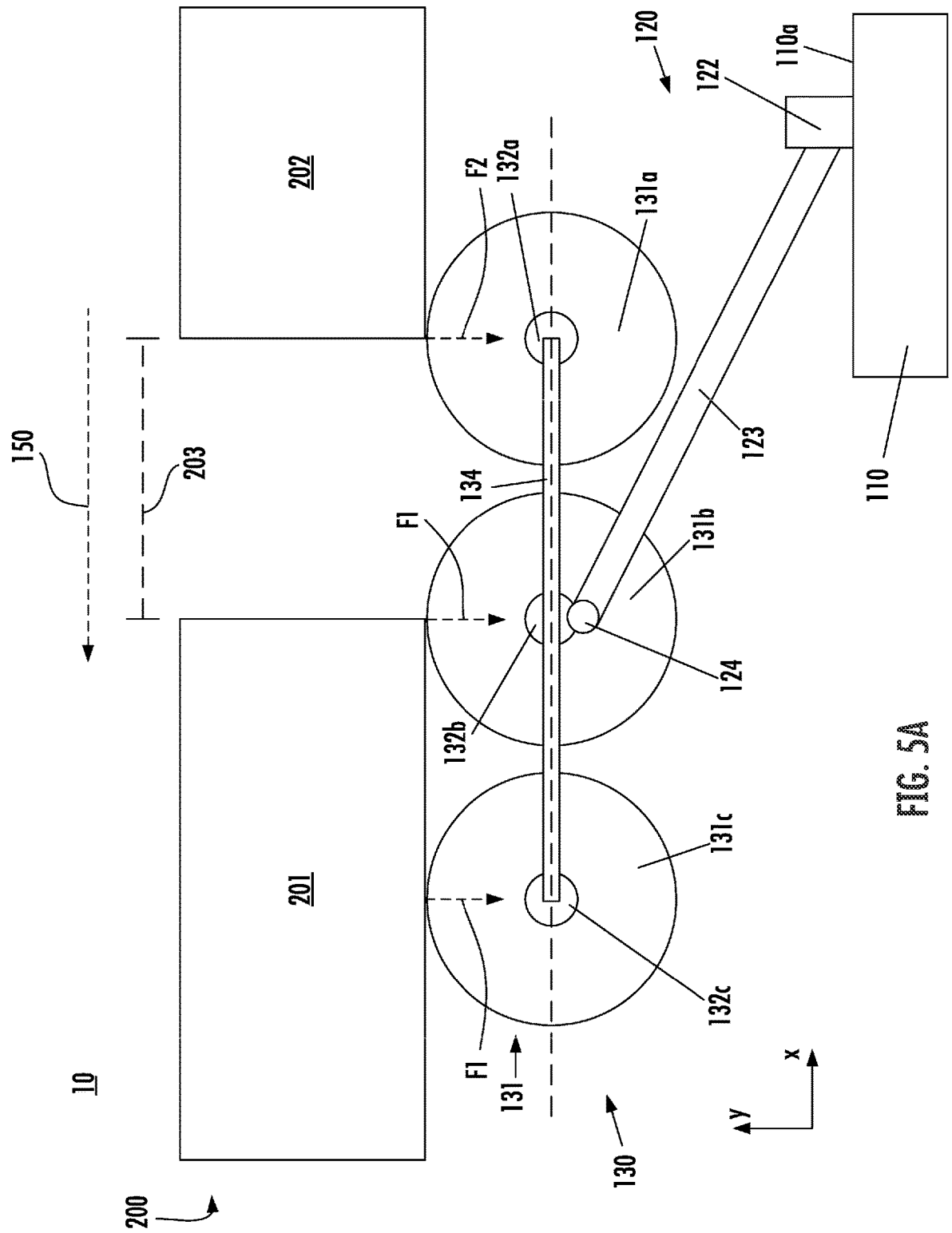
FIGS. 5A-5C illustrate various schematic side views of an exemplary cart grounding device engaged with a plurality of conveyor carts of a material handling system according to various documents described herein.
Figure 5B:
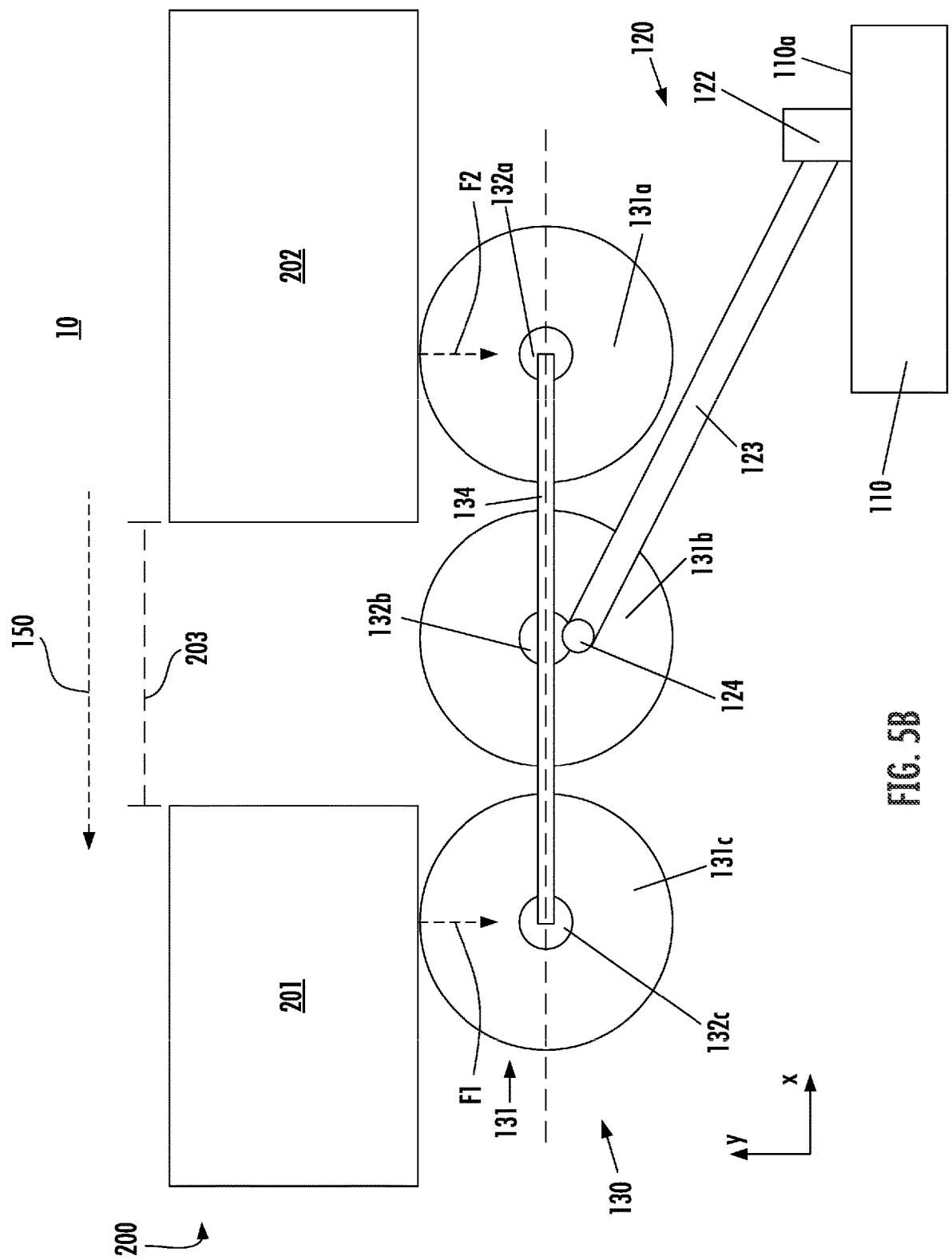
Figure 5C:
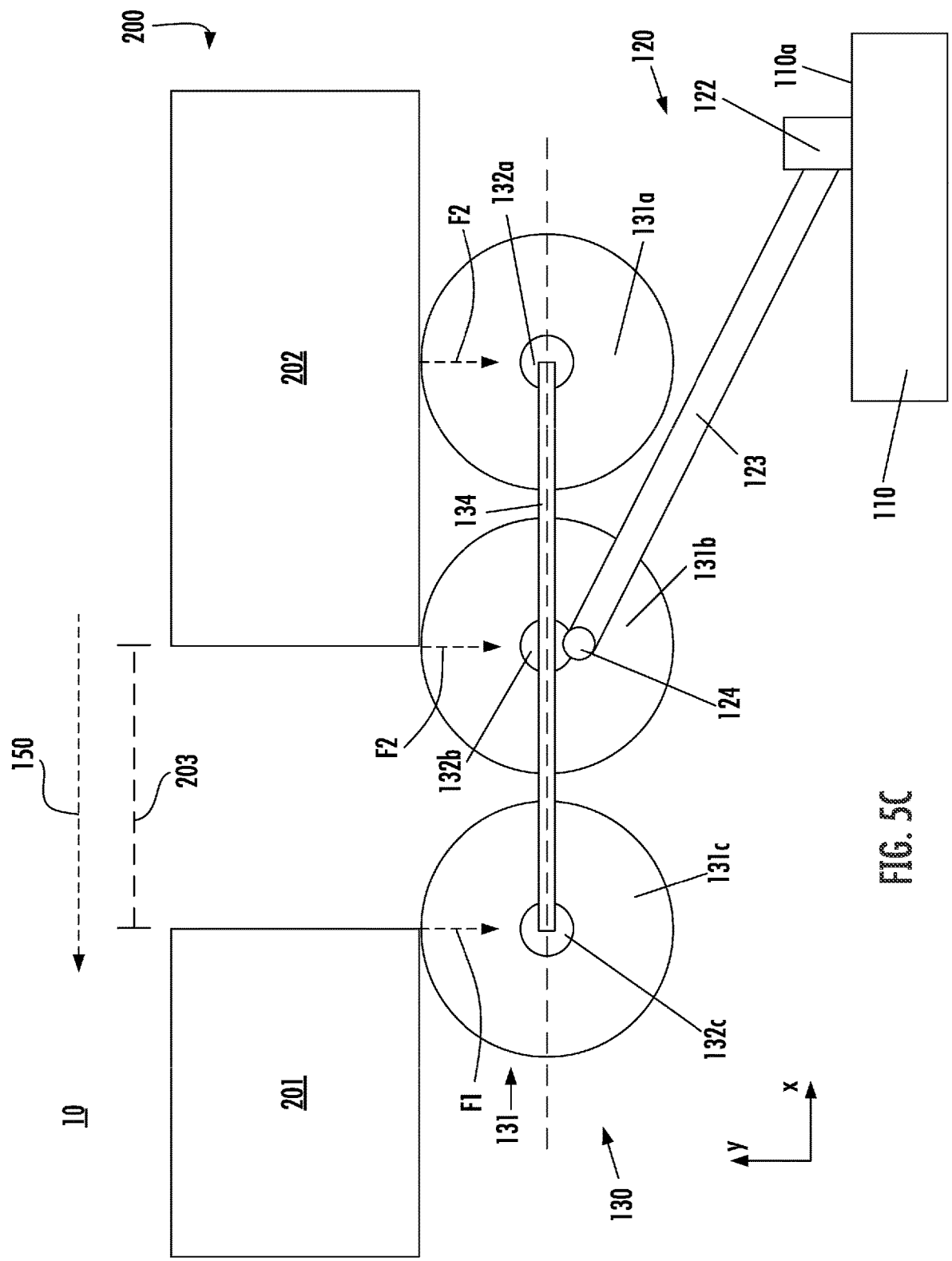

FIGS. 5A-5C illustrate various schematic side views of an exemplary cart grounding device engaged with a plurality of carts of a material handling system according to various documents described herein. In particular, FIGS. 5A-5C a schematic diagram of a material handling system comprising a plurality of conveyor carts traveling along a conveyor travel path defined by a looped sorter conveyor and an exemplary cart grounding device configured for continuous engagement with the dynamic chain conveyor carts such that the each of the plurality of dynamic carts remains grounded during operation of the sorter conveyor. As illustrated in FIG. 5A, a material handling system 10 may comprise a plurality of carts 200 embodying a chain of conveyor carts that includes a first conveyor cart 201 and a second conveyor cart 202. As described herein, in various embodiments, each cart of the plurality of carts 200 of the material handling system 10 may move one after another in a sorter cart train fashion along a conveyor travel path defined by the conveyor frame. As illustrated, the first conveyor cart 201 and the second conveyor cart 202 may be adjacent conveyor carts of the plurality of carts 200 that may be secured relative to one another by a cart coupling assembly configured to maintain the plurality of carts 200 as a chain of conveyor carts configured for movement throughout the looped configuration of a sorter conveyor (e.g., along the cart travel path). As illustrated, adjacent carts such as, for example, the first and second conveyor carts 201, 202 of the plurality of conveyor carts 200 maybe arranged relative to one another such that a gap 203 is defined therebetween. For example, in such an exemplary circumstance, the gap 203 between the first conveyor cart 201 and the second conveyor cart 202 may define the non-continuous configuration of adjacent carts within the chained plurality of carts 200. That is, the material handling system 10 may be configured such that the plurality of carts 200 does not include an at least substantially continuous surface at which the cart grounding device 100 may engage the plurality of carts 200 and maintained a fully engaged connection throughout the movement of the chain of carts 200 along the sorter conveyor. As a non-limiting example, in various embodiments, adjacent conveyor carts of the plurality of conveyor carts 200 maybe arranged relative to one another such that the gap 203 defined therebetween comprises a linear distance of at least approximately between 12 mm and 75 mm (e.g., between 47.5 mm and 52.5 mm).

In various embodiments, an exemplary cart grounding device 100 may be configured to facilitate an at least substantially continuous engagement of the plurality of carts 200 based at least in part on the configuration of the three grounding wheels 131 of the cart interface component 130 and the biased configuration of the arm assembly 120 that subjects the cart interface component 130 to a constant upward pushing force to drive the plurality of grounding wheels 131 of the cart interface component 130 in a vertically upward linear direction (e.g., at least partially in the positive y-direction as defined in the exemplary orientations illustrated in FIGS. 5A-5C). As described herein, the cart grounding device 100 is configured to be arranged relative to a conveyor frame of a sorter conveyor in a position directly beneath at least a portion of the cart travel path along which that plurality of chained conveyor carts 200 travels throughout the sorter conveyor. In such an arrangement, the biased configuration of the arm assembly 120 that constantly forces the cart interface component 130 (e.g., the plurality of grounding wheels 131) in an at least partially upward direction may force the plurality of grounding wheels 131 to be pressed into a surface (e.g., a bottom surface) of each of the plurality of conveyor carts 200 as they pass over top the cart grounding device 100.

For example, as illustrated in FIG. 5A, in an exemplary configuration wherein the plurality of grounding wheels 131 are distributed in a consecutive arrangement along the cart interface component length and the third grounding wheel 131c is provided in a downstream-most position of the plurality 131, as defined relative to the first direction 150 of the conveyor travel path, the biased configuration of the of the arm assembly 120, as described herein, causes the plurality of grounding wheels 131 to be pushed in an upward vertical direction such that a conveyor cart traveling in the first direction 150 defined by the cart travel path may first engage the first grounding wheel 131a, followed in sequence by the second and third grounding wheels 131b, and 131c, respectively. In various embodiments, for example, in the exemplary circumstance illustrated in FIG. 5A, a first conveyor cart 201 may continue to travel in the first direction 150 such that the first conveyor cart 201 passes beyond and/or disengages the first grounding wheel 131a while maintaining physical contact with both the second grounding wheel 131b and third grounding wheel 131c positioned downstream from the first grounding wheel 131a.

Further, in various embodiments, the cart grounding device 100 may be configured such that as first conveyor cart 201 continues to travel in the first direction 150, the first conveyor cart 201 passes beyond and/or disengages the second grounding wheel 131b upon (e.g., at least substantially immediately after) the second conveyor cart 202 physically contacting the first grounding wheel 131a provided in the upstream-most position of the plurality 131, such that the plurality of conveyor carts 200 (e.g., the adjacent first and second conveyor carts 201, 202) are in continuous contact with at least two of the plurality of grounding wheels 131 throughout operation of the materials handling system 10. For example, the cart interface component 130 of the exemplary cart grounding device 100 may be configured such that both the third grounding wheel 131c and the second grounding wheel 131b remain in physical contact with the first conveyor cart 201 until after (e.g., at least substantially simultaneously with) the first grounding wheel 131a engaging the second conveyor cart 202. In such an exemplary configuration, as illustrated, the engagement of a bottom surface of the first conveyor cart 201 with the third grounding wheel 131c and the second grounding wheel 131b may generate at least substantially downward vertical forces F1 that act on each of the third grounding wheel 131c and the second grounding wheel 131b, respectively. Further, the engagement of a bottom surface of the second conveyor cart 202 with the first grounding wheel 131a may generate an at least substantially downward vertical force F2 that acts on the first grounding wheel 131a.

For example, in various embodiments, the configuration of the cart interface component 130 (e.g., the configuration and/or distribution of the plurality of grounding wheels 131) may correspond at least in part to the distance defined by the gap 203 between adjacent carts of the plurality of conveyor carts 200 moving throughout the sorter conveyor, such that the plurality of grounding wheels 131 are configured to span the gap 203 to maintain a continuous physical contact between the plurality of carts 200 and the cart interface component 130. As non-limiting examples, the diameter of the grounding wheels 131, the separation distance between the first and third grounding wheels 131a, 131c, and/or the like may be configured to facilitate a continuous physical contact between the plurality of grounding wheels 131 and at least one of the adjacent conveyor carts 201, 202 as the gap 203 defined therebetween passes overtop the cart grounding device 100. For example, the cart interface component 130 may be configured such that two or more of the plurality of grounding wheels 131 are in physical contact with the plurality of carts 200 at any given time.

FIG. 5B schematically illustrates the exemplary material handling system 10 of FIG. 5A in an exemplary circumstance wherein, relative to the illustrated configuration shown in FIG. 5A, the plurality of carts 200 is moved further along the cart travel path in the first direction 150 such that a rear end of the first conveyor cart 201 has moved past and/or disengaged the second grounding wheel 131b as a front end of the second conveyor cart 202 in physical contact with the first grounding wheel 131a approaches the second grounding wheel 131b. As illustrated, in various embodiments, the cart interface component 130 may be configured such that the plurality of carts 200 remains in physical contact with two of the plurality of grounding wheels 131—the first and third grounding wheels 131a, 131c that are in contact with the second and first conveyor carts 202, 201, respectively—while the second grounding cart 131b of the cart interface component 130 is temporarily positioned in-line with the gap 203 between the adjacent conveyor carts 201, 202. In such an exemplary configuration, as illustrated, the engagement of a bottom surface of the first conveyor cart 201 with the third grounding wheel 131c (e.g., and the biased configuration of the arm assembly 120) may generate an at least substantially downward vertical force F1 that acts on the third grounding wheel 131c, and the engagement of a bottom surface of the second conveyor cart 202 with the first grounding wheel 131a (e.g., and the biased configuration of the arm assembly 120) may generate an at least substantially downward vertical force F2 that acts on the first grounding wheel 131a. The cart grounding assembly 100 may be configured such that the first vertical force F1 imparts a non-lateral torque and a moment on the cart interface component 130 in a first rotational direction (e.g., counter-clockwise about the distal hinge 124, as illustrated) and the second vertical force F2 imparts a non-lateral torque and a moment on the cart interface component 130 in an opposite second rotational direction (e.g., clockwise about the distal hinge 124, as illustrated) that at least substantially counteracts the resultant forces defined at the third grounding wheel 131c. For example, the net moment acting on the cart interface component 130 in such an exemplary circumstance may be at least substantially zero (e.g., of a negligible value) such that the cart interface component 130 may define an at least substantially level configuration (e.g., relative to an at least substantially horizontal ground surface upon which a conveyor frame of the sorter conveyor is positioned).

FIG. 5C schematically illustrates the exemplary material handling system 10 of FIGS. 5A and 5B in an exemplary circumstance wherein, relative to the illustrated configuration shown in FIG. 5B, the plurality of carts 200 is moved further along the cart travel path in the first direction 150 such that a rear end of the first conveyor cart 201 has moved past and/or disengaged the second grounding wheel 131b as a front end of the second conveyor cart 202 has moved into in physical contact with the first grounding wheel 131a approaches the second grounding wheel 131b.

As illustrated in FIG. 5C, in various embodiments, the cart grounding device 100 may be configured such that as first conveyor cart 201 continues to travel in the first direction 150, the first conveyor cart 201 may passe beyond and/or disengages the third grounding wheel 131b upon (e.g., at least substantially immediately after) the second conveyor cart 202 physically contacting the second grounding wheel 131b, so as to maintain the continuous contact of the plurality of conveyor carts 200 with at least two of the plurality of grounding wheels 131. For example, the cart interface component 130 of the exemplary cart grounding device 100 may be configured such that the third grounding wheel 131c remains in physical contact with the first conveyor cart 201 until after (e.g., at least substantially simultaneously with) the second grounding wheel 131b engages the second conveyor cart 202 such that the second conveyor cart is in physical contact with both the first and second grounding wheels 131a, 131b. In such an exemplary configuration, as illustrated, prior to the third grounding wheel 131c disengaging the first conveyor cart 201, the engagement of a bottom surface of the first conveyor cart 201 with the third grounding wheel 131c may generate an at least substantially downward vertical force F1 that acts on the third grounding wheel 131c. Further, the engagement of a bottom surface of the second conveyor cart 202 with the second grounding wheel 131b and the first grounding wheel 131a may generate at least substantially downward vertical forces F2 that act on the second grounding wheel 131b and the first grounding wheel 131a, respectively.

In various embodiments, an exemplary cart grounding device 100 may be configured to facilitate reconfiguration of the freely-rotatable cart interface component 130 between a level configuration (as shown in the exemplary embodiments illustrated in FIGS. 5A-5C) and one or more angled configurations (e.g., a first angled configuration defined by a first tilt angle 161) in response to one or more forces from the plurality of conveyor carts 200 to enable the cart grounding device 100 to accommodate one or more misalignments in adjacent conveyor carts of the plurality 200 while maintaining continuous, effective operation of the sorter conveyor. The rotation of the cart interface component 130 about the distal hinge 124 independent of the rotation of the arm assembly 120 ensures that at least a portion of one of a misaligned pair of adjacent conveyor carts maintains a physical connection with the cart interface component 130 as the misaligned adjacent carts travel along the cart travel path overtop the cart grounding device 100. As an illustrative example described with reference to the exemplary embodiment illustrated in FIG. 6A, such an exemplary configuration of the cart interface component 130 may ensure that the first grounding wheel 131a physically contacts a misaligned second conveyor cart 202 prior to the first conveyor cart 201 disengaging the third grounding wheel 131c to avoid a disruption in the high-load ground path defined between the plurality of carts 200 and the cart grounding device 100 resulting from the conveyor cart misalignment.

Figure 6A:
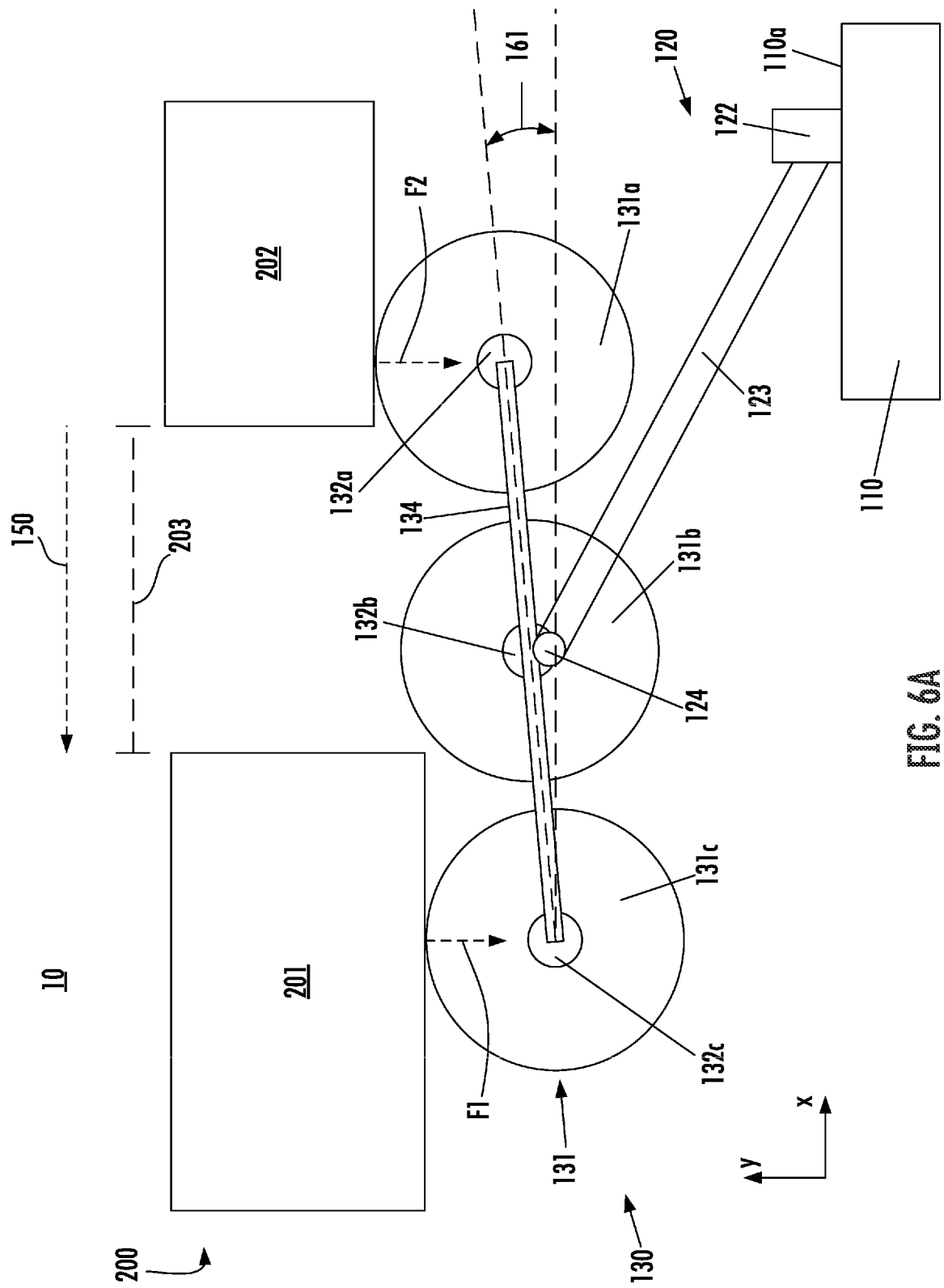
FIGS. 6A and 6B illustrate various schematic side views of an exemplary cart grounding device engaged with a plurality of conveyor carts of a material handling system according to various documents described herein.

For example, in various embodiments, the biased configuration of the arm assembly 120 and the hinged connection of the cart interface component 130 to the arm element 123 at the distal hinge 124 may be configured such that a physical contact with a grounding wheel of the plurality 131 of the cart interface component 130 may result in a pushing force being imparted on the grounding wheel from the conveyor cart engaged therewith. For example, as illustrated in FIG. 6A, the engagement of a bottom surface of the first conveyor cart 201 with the third grounding wheel 131c may generate an at least substantially downward vertical force F1 (e.g., in the negative y-direction as defined in the exemplary orientations illustrated in FIGS. 6A and 6B) that acts on the third grounding wheel 131c and imparts a non-lateral torque and a moment on the cart interface component 130. In the misaligned cart configuration shown in the exemplary embodiment shown in FIG. 6A, such a moment resulting from the force F1 imparted on the cart interface component 130 (e.g., the third grounding wheel 131c) may cause the cart interface component 130 to rotate relative to the arm element 123 in the counter-clockwise direction (e.g., as defined in the exemplary orientation illustrated in FIGS. 6A and 6B) about the axis of rotation defined by the distal hinge 124 until the first grounding wheel 131a physically contacts the second conveyor cart 202. As illustrated, the engagement of a bottom surface of the second conveyor cart 202 with the first grounding wheel 131a may generate an at least substantially downward vertical force F2 (e.g., in the negative y-direction as defined in the exemplary orientations illustrated in FIGS. 6A and 6B) that acts on the first grounding wheel 131a and imparts a non-lateral torque and a moment on the cart interface component 130 that opposes the corresponding moment imparted by the first downward force F1 acting on at least the third grounding wheel 131c (and/or the second grounding wheel 131b). For example, such a rotation of the cart interface component 130 may be defined by the third grounding wheel 131c being depressed in an at least partially downward direction and the first grounding wheel 131a positioned on the opposing end of the distal hinge 124 to be raised in an at least partially upward vertical direction, so as to position the cart interface component 130 in an angled configuration defined by a tilt angle 161.

Figure 6B:
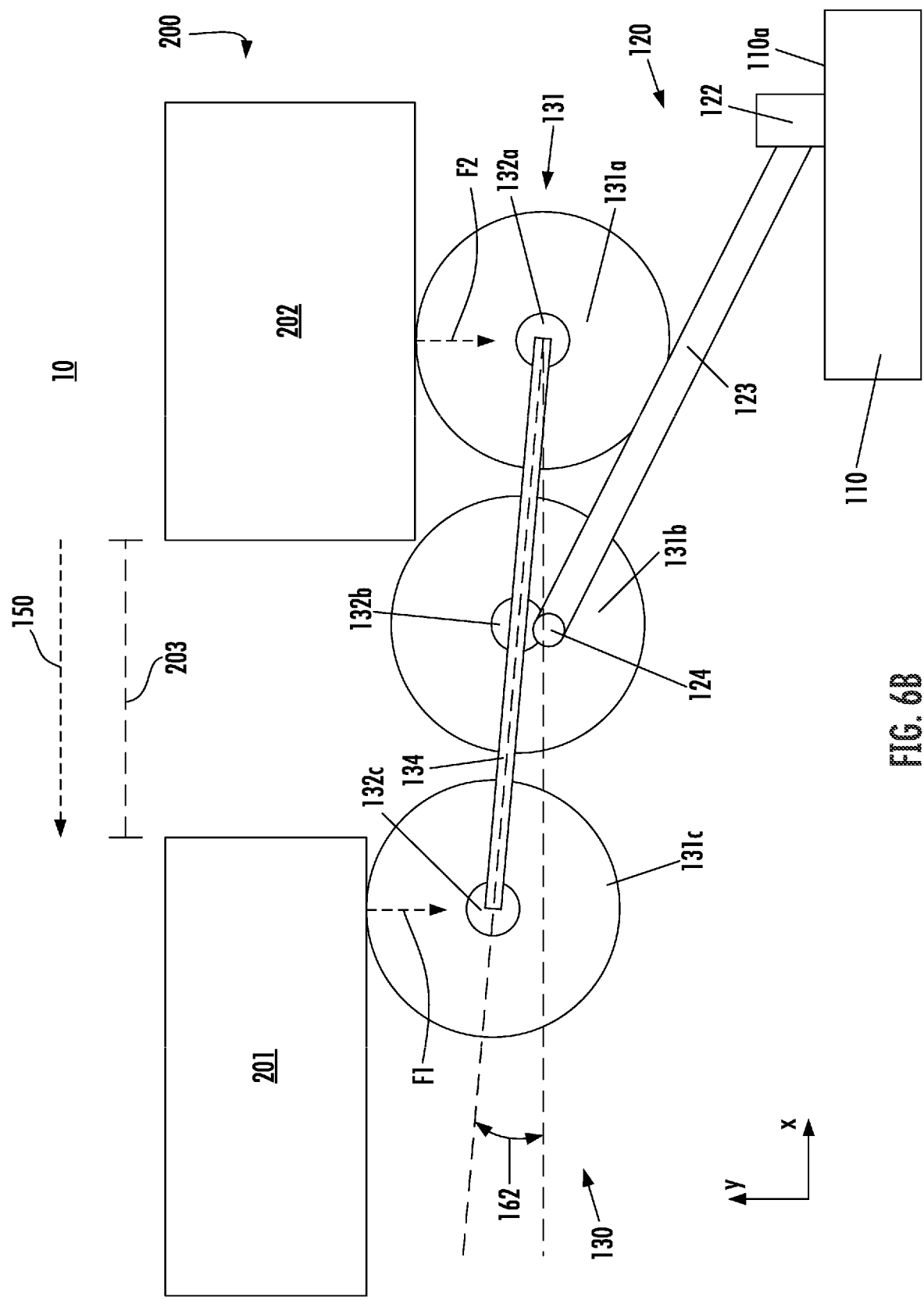

Further, FIG. 6B schematically illustrates the exemplary material handling system 10 of FIG. 6A in an exemplary circumstance wherein, relative to the illustrated configuration shown in FIG. 6A, a plurality of misaligned adjacent carts is moved along the cart travel path in the first direction 150 such that the first conveyor cart 201 is about to pass beyond the third grounding wheel 131c as the. For example, upon the first conveyor cart 201 disengaging the conductive bristles of the third grounding wheel 131c the high-load ground path defined between the first conveyor cart 201 and the ground wire of the cart grounding device 100 (e.g., as enabled by the contact of the first conveyor cart 201 with one of the plurality of grounding wheels 131) may be eliminated. For example, as illustrated, the cart interface component 130 of the exemplary cart grounding device 100 may be configured such that prior to and/or at least substantially simultaneously with the first conveyor cart 201 disengaging the third grounding wheel 131*c*, the second conveyor cart 202 that is already in contact with the first grounding wheel 131*a* may establish a physical contact with the second grounding wheel 131*b* to further facilitate the continuous engagement of the cart interface component 130 with the plurality of carts 200, as described herein.

As illustrated in FIG. 6B, the engagement of a bottom surface of the second conveyor cart 202 with the first grounding wheel 131*a* may generate an at least substantially downward vertical force F2 (e.g., in the negative y-direction as defined in the exemplary orientations illustrated in FIGS. 6A and 6B) that acts on the first grounding wheel 131*a* and imparts a non-lateral torque and a moment on the cart interface component 130. As shown, such a moment resulting from the force F2 imparted on the cart interface component 130 (e.g., the first grounding wheel 131*a*) may cause the cart interface component 130 to rotate relative to the arm element 123 in the clockwise direction (e.g., as defined in the exemplary orientation illustrated in FIGS. 6A and 6B) about the axis of rotation defined by the distal hinge 124 based at least in part on the misaligned configuration of the adjacent conveyor carts 201, 202. For example, such a rotation of the cart interface component 130 may be defined by the first grounding wheel 131*a* being depressed in an at least partially downward direction so as to position the cart interface component 130 in an angled configuration defined by a tilt angle 162.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A cart grounding device for at least one conveyor cart of a conveyor assembly, the cart grounding device comprising:
   a frame engagement element configured for attachment to at least a portion of the conveyor assembly;
   an arm assembly comprising an arm element defined by an arm length the extends from a proximal arm end to a distal arm end, the arm element being hingedly connected relative to the frame engagement element at the proximal arm end; and
   a cart interface component connected to the distal arm end of the arm element and configured to physically engage at least a portion of a connected plurality of conveyor carts of the conveyor assembly to provide a ground path from the connected plurality of conveyor carts to a ground, the cart interface component comprising one or more grounding wheels configured to physically contact the at least a portion of the connected plurality of conveyor carts to define at least a portion of the ground path, each of the one or more grounding wheels being configured to rotate about a respective central wheel axle based on one or more forces imparted on the one or more grounding wheels from the at least a portion of the connected plurality of conveyor carts in physical contact therewith, wherein the one or more grounding wheels are arranged such that each of a respective central wheel axles extends in a direction perpendicular to the arm length of the arm element, and wherein the arm assembly defines a biased configuration defined by a biasing force that biases the cart interface component in one or more directions at least partially towards the connected plurality of conveyor carts.

2. The cart grounding device of claim 1, wherein the cart interface component is pivotably connected to the arm element at one or more distal hinges provided at the distal arm end of the arm element.

3. The cart grounding device of claim 2, wherein the cart interface component is configured to freely rotate about the one or more distal hinges independent of an angular configuration of the arm element.

4. The cart grounding device of claim 3, wherein the cart interface component is configured such that a center of gravity of the cart interface component is positioned at least substantially directly below an axis of rotation defined by the one or more distal hinges.

5. The cart grounding device of claim 1, wherein the one or more grounding wheels of the cart interface component are defined by a plurality of grounding wheels.

6. The cart grounding device of claim 5, wherein a rotation of each grounding wheel of the one or more grounding wheels is defined in a rotational direction that is at least substantially parallel to a cart travel path along which the connected plurality of conveyor carts travel throughout the conveyor assembly.

7. The cart grounding device of claim 5, wherein the plurality of grounding wheels comprises three grounding wheels.

8. The cart grounding device of claim 7, wherein the three grounding wheels are distributed along a cart interface component length defined by the cart interface component such that the three grounding wheels define a consecutive arrangement as measured in a direction parallel to a cart travel path defined by the conveyor assembly.

9. The cart grounding device of claim 1, wherein the cart interface component further comprises one or more connection rods physically engaged with each of the one or more grounding wheels to operatively connect each of the one or more grounding wheels to the ground, wherein the each of the one or more connection rods defines at least a portion of the ground path.

10. The cart grounding device of claim 1, wherein the cart interface component further comprises a housing element engaged with each of the one or more grounding wheels and configured to facilitate a fixed linear arrangement of each of the one or more grounding wheels along a cart interface component length of the cart interface component.

11. The cart grounding device of claim 1, wherein each of the one or more grounding wheels comprises a plurality of conductive bristles extending from the respective central wheel axle in a radially outward direction, the plurality of conductive bristles being distributed throughout an outer surface defined by the central wheel axle.

12. The cart grounding device of claim 11, wherein the plurality of conductive bristles is made of an at least substantially non-rigid, conductive material.

13. The cart grounding device of claim 1, wherein the biased configuration of the arm assembly is defined at least in part by a spring element configured to apply one or more bias forces to the arm element to bias the arm element in a first rotational direction defined relative to an axis of rotation defined by a base hinge, the base hinge being configured to define a hinged connection between the arm element and the frame engagement element; wherein the first rotational direction is defined such that the arm element is biased to rotate at least partially away from a top surface of the frame engagement element.

14. The cart grounding device of claim 1, wherein the cart grounding device is configured such that the arm element being biased to rotate in a first rotational direction at least partially away from a top surface of the frame engagement element causes the cart interface component to be biased to move in a first linear direction defined in an at least partially vertically upward direction.

15. The cart grounding device of claim 1, wherein the frame engagement element is configured to engage a conveyor frame of the conveyor assembly to define a position of the cart grounding device along a cart travel path along which the connected plurality of conveyor carts travel throughout the conveyor assembly.

16. The cart grounding device of claim 15, wherein the position of the cart grounding device is defined by an arrangement wherein the cart grounding device is positioned directly beneath at least a portion of the cart travel path.

17. The cart grounding device of claim 1, further comprising a ground wire operatively connected to both the ground and the one or more grounding wheels of the cart interface component.

18. The cart grounding device of claim 1, wherein the cart interface component is configured such that the ground path defined upon a physical engagement with the at least a portion of the connected plurality of conveyor carts is established by a contact of the at least a portion of the connected plurality of conveyor carts with any of the one or more grounding wheels.

19. The cart grounding device of claim 1, wherein the one or more grounding wheels comprise a rotatable configuration that minimizes an impact of an engagement between the connected plurality of conveyor carts and the cart interface component to enable a grounding wheel configuration defined by a plurality of conductive bristles made from a material having an increased electrical capacity; wherein the increased electrical capacity of the plurality of conductive bristles of the one or more grounding wheels corresponds to the ground path being defined by an increased electrical load capacity.

20. A method of operating a cart grounding device for at least one conveyor cart of a conveyor assembly, the method comprising:

arranging the cart grounding device relative to the conveyor assembly such that each of a connected plurality of conveyor carts physically engages the cart grounding device as each conveyor cart moves along a cart travel path defined by the conveyor assembly, the cart grounding device comprising a frame engagement element, an arm assembly, and a cart interface component:

attaching the frame engagement element to at least a portion of the conveyor assembly;

connecting the arm assembly, wherein the arm assembly comprises an arm element defined by an arm length the extends from a proximal arm end to a distal arm end, and wherein the arm element is hingedly connected relative to the frame engagement element at the proximal arm end; and connecting the cart interface component to the distal arm end of the arm element and configured to physically engage the connected plurality of conveyor carts to provide at least one ground path from the connected plurality of conveyor carts to a ground, the cart interface component comprising one or more grounding wheels configured to physically contact the connected plurality of conveyor carts to define at least a portion of the at least one ground path, each of the one or more grounding wheels being configured to rotate about a respective central wheel axle based on one or more forces imparted on the one or more grounding wheels from the connected plurality of conveyor carts in physical contact therewith, wherein the one or more grounding wheels is arranged such that each of a respective central wheel axles extends in a direction perpendicular to the arm length of the arm element, wherein the arm assembly defines a biased configuration defined by a biasing force that biases the cart interface component in one or more directions at least partially towards the connected plurality of conveyor carts, and wherein the cart interface component of the cart grounding device is configured to maintain a continuous physical contact between at least a portion of the one or more grounding wheels and the connected plurality of conveyor carts as the connected plurality of conveyor carts moves along the cart travel path.

\* \* \* \* \*